(12) United States Patent
Lee et al.

(10) Patent No.: US 11,192,252 B2
(45) Date of Patent: *Dec. 7, 2021

(54) ROBOT

(71) Applicant: LG ELECTRONICS INC., Seoul (KR)

(72) Inventors: Iljae Lee, Seoul (KR); Dooil Byun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 320 days.

This patent is subject to a terminal disclaimer.

(21) Appl. No.: 16/440,313

(22) Filed: Jun. 13, 2019

(65) Prior Publication Data

US 2019/0381667 A1     Dec. 19, 2019

(30) Foreign Application Priority Data

Jun. 15, 2018 (KR) .................. 10-2018-0069114

(51) Int. Cl.
| | |
|---|---|
| *B62D 61/10* | (2006.01) |
| *B25J 9/16* | (2006.01) |

(Continued)

(52) U.S. Cl.
CPC .............. *B25J 9/1679* (2013.01); *B25J 5/007* (2013.01); *B25J 9/0009* (2013.01); *B25J 9/162* (2013.01); *B25J 9/1661* (2013.01); *B25J 11/008* (2013.01)

(58) Field of Classification Search
CPC ....... H05K 5/0017; B25J 9/0009; B25J 5/007; B25J 9/162; B25J 11/008; B25J 9/126;

(Continued)

(56) References Cited

U.S. PATENT DOCUMENTS

| | | | | |
|---|---|---|---|---|
| 6,144,180 A | * | 11/2000 | Chen .................... | B62D 57/028 318/568.1 |
| 2019/0150687 A1 | * | 5/2019 | Kwon .................... | A47L 9/1658 |

(Continued)

FOREIGN PATENT DOCUMENTS

| | | |
|---|---|---|
| JP | H06-014106 | 2/1994 |
| JP | 2006-102861 | 4/2006 |

(Continued)

OTHER PUBLICATIONS

Sales et al., Grid Ant Colony Optimization Applied to a Multi-robotic Garbage Collection System, 2014, IEEE, p. 187-192 (Year: 2014).*

(Continued)

*Primary Examiner* — McDieunel Marc
(74) *Attorney, Agent, or Firm* — Ked & Associates LLP

(57) ABSTRACT

A robot is provided. The robot includes a lower module includes a wheel and a motor provided inside the lower module, and an upper module disposed at an upper portion of the lower module and including a trash can assembly and a display unit. The upper module includes a body part coupled to the upper portion of the lower module and a head part rotatably coupled to an upper portion of the body part. The body part includes a front case forming a front outer appearance of the body part and including the trash can assembly provided inside the front case, and a rear case forming a rear outer appearance of the body part and including the display unit.

20 Claims, 11 Drawing Sheets

(51) Int. Cl.
*B25J 11/00* (2006.01)
*B25J 9/00* (2006.01)
*B25J 5/00* (2006.01)

(58) Field of Classification Search
CPC .... B25J 9/1661; B25J 9/1697; B25J 11/0085; B25J 19/023; B65F 2230/14; B65F 1/1473; B62D 61/10; B62D 63/02; G05D 1/0088; G05D 1/021; G05D 2201/0215; B60L 2200/40; F21V 33/0044
See application file for complete search history.

(56) References Cited

U.S. PATENT DOCUMENTS

| 2019/0382200 A1* | 12/2019 | Lee | B65F 1/1473 |
|---|---|---|---|
| 2020/0023513 A1* | 1/2020 | Ha | B25J 5/007 |

FOREIGN PATENT DOCUMENTS

| KR | 10-0516850 | 9/2005 |
|---|---|---|
| KR | 10-2010-0094645 | 8/2010 |
| KR | 10-1000854 | 12/2010 |
| KR | 20-0454523 | 7/2011 |
| KR | 10-2011-0124593 | 11/2011 |
| KR | 20-0460793 | 6/2012 |
| KR | 10-1193610 | 10/2012 |
| KR | 10-2013-0049222 | 5/2013 |
| KR | 10-1412527 | 6/2014 |
| KR | 10-2018-0020755 | 2/2018 |

OTHER PUBLICATIONS

Ferri et al., DustCart, an autonomous robot for door-to-door garbage collection: From DustBot project to the experimentation in the small town of Peccioli, 2011, IEEE, p. 655-660 (Year: 2011).*
Vargas et al., Applying particle swarm optimization to a garbage and recycling collection problem, 2012, IEEE, p. 1-8 (Year: 2012).*
Sempe et al., Adaptive patrol for a group of robots, 2003, IEEE, p. 2865-2869 (Year: 2003).*
Korean Notice of Allowance dated Jun. 8, 2020 issued in KR Application No. 10-2018-0069114.
Korean Notice of Allowance dated Jun. 8, 2020 issued in KR Application No. 10-2018-0069115.
Mazzolai et al., *The DustCart Service Robot at Work in the Town of Peccioli: Focus on Social and Legal Challenges*, Urban Service Robotics: Challenges and Opportunities, The 15th International Conference on Advanced Robotics, Jun. 20, 2011.
Korean Office Action dated Dec. 12, 2019 issued in KR Application No. 10-2018-0069114.
U.S. Appl. No. 16/440,225, filed Jun. 13, 2019.
U.S. Appl. No. 16/440,313, filed Jun. 13, 2019.
Korean Office Action dated Dec. 12, 2019 issued in KR Application No. 10-2018-0069115.

* cited by examiner

ROBOT

CROSS-REFERENCE TO RELATED APPLICATION

This application claims priority under 35 U.S.C. § 119 to Korean Application No. 10-2018-0069114 filed on Jun. 15, 2018, whose entire disclosure is hereby incorporated by reference. This application is also related to U.S. patent application Ser. No. 16/440,225 filed on Jun. 13, 2019, whose entire disclosure is hereby also incorporated by reference.

BACKGROUND

1. Field

The present description relates to a robot, and particularly to a robot that performs a guide function.

2. Background

The application fields of robots are generally classified into industrial, medical, space, and submarine fields. For example, in the mechanical machining industry such as the production of a vehicle, robots may perform repeated work. In other words, there are present many industrial robots which continuously repeat the same work once a human being teaches work performed by the arm of the human being.

In addition, a technique, in which a camera is mounted on a robot, has already been widely realized. The robot may determine the position thereof or recognize an obstacle using the camera. In addition, displaying the captured image on the display unit has been sufficiently realized.

In general, although the robot provides various services depending on places, users, or purposes, the robot performs only a typical operation of moving to a specified distance at a specified speed for a specified hour while enduring a specified load in order to provide the services.

Recently, a scheme has been developed to provide, through a robot, a service within an airport to cope with the explosive growth of airport users and in an effort to make a leap into a smart airport. When an artificial intelligence (AI) robot is employed for an airport, the robot may perform the intrinsic role, which cannot be performed by an existing computer system, of a human being in place of the human being. Accordingly, it may be expected that the provided service is improved in quantitative and qualitative aspects.

The demands for robots which provide convenience to a user or take the role of a human being are rapidly increased throughout social facilities, such as large shopping facilities, cultural facilities, and public facilities, as well as the airport.

Korean Patent Registration No. 10-1193610 (issued on Oct. 16, 2012) discusses an intelligent robot for providing traffic information and having an autonomous traveling function. The reference discloses a robot which avoids an obstacle while autonomously traveling in a crosswalk to make a traffic guidance map. However, although the conventional robot outputs an alarm sound or displays display information on a screen of a display to provide traffic information, the robot cannot serve as a trash can for collecting garbage.

For example, although an airport has a wide internal space, a smaller number of trash cans are disposed. Accordingly, it is difficult for users of an airport to find the trash can. In addition, the trash can is provided at the corner of the airport due to the problem related to the outer appearance thereof and the bed odor thereof. Accordingly, the user of the airport has to go to the corner of the airport, at which the trash can is present, to throw away the garbage. In addition, when the garbage is fully filled in the trash can, a cleaner has to go to each of trash cans spaced apart from each other to empty the trash can.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which aspects of the present description may be practiced. These embodiments are described in sufficient detail to enable those skilled in the art to practice the description, and it is understood that other embodiments may be utilized and that logical structural, mechanical, electrical, and chemical changes may be made without departing from the spirit or scope of the description. To avoid detail not necessary to enable those skilled in the art to practice the description, the description may omit certain information known to those skilled in the art. The following detailed description is, therefore, not to be taken in a limiting sense.

Also, in the description of embodiments, terms such as first, second, A, B, (a), (b) or the like may be used herein when describing components of the present description. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

In the present specification, an embodiment that a guide robot is applied to an airport will be described by way of example. However, it should be noted that the guide robot according to the present description is applicable not only to the airport, but to all social facilities such as a large shopping facility, a cultural facility or a public facility.

Figure 1:
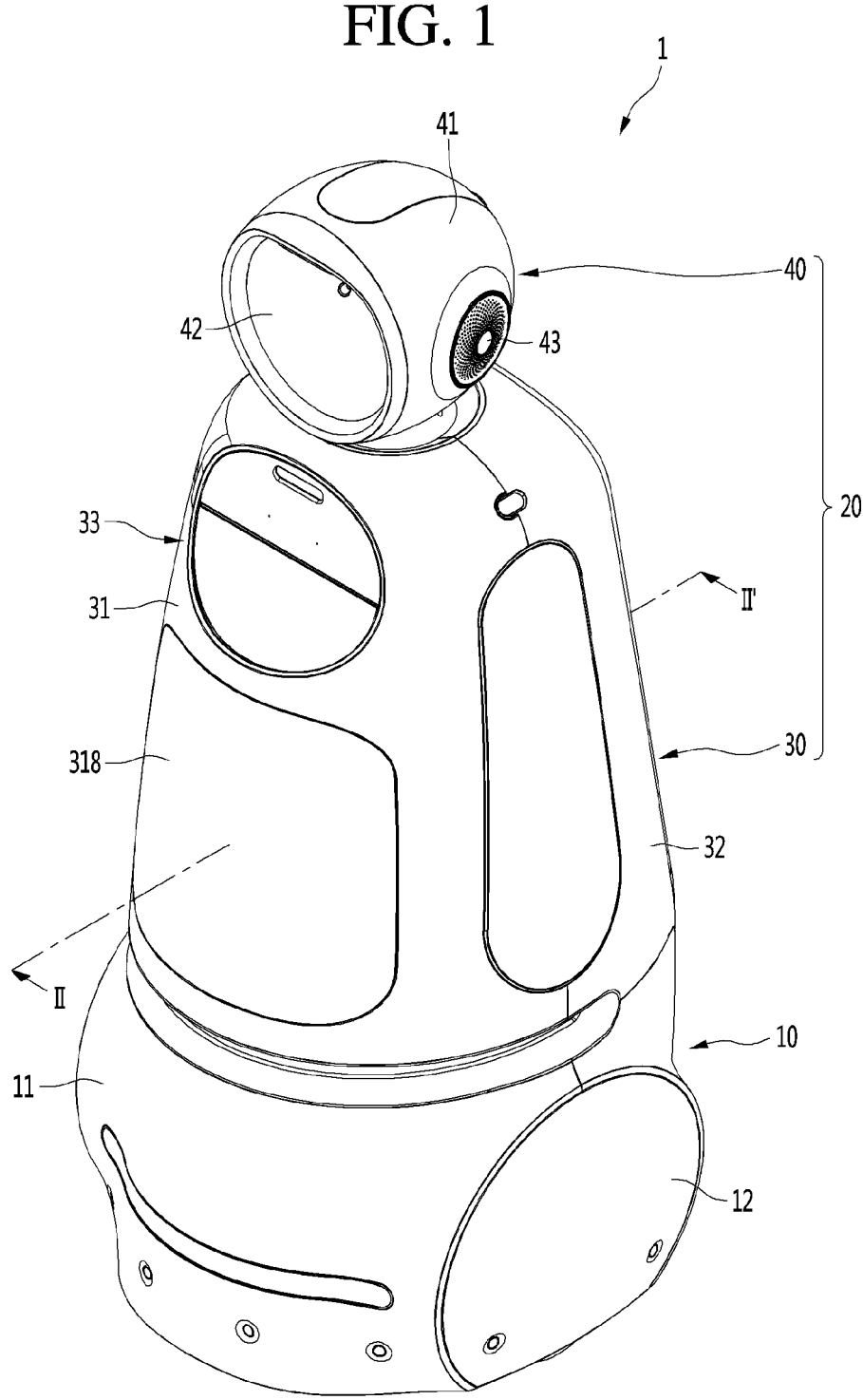
FIG. 1 is a front perspective view illustrating an outer appearance of a guide robot according to an embodiment of the present description.
Figure 2:
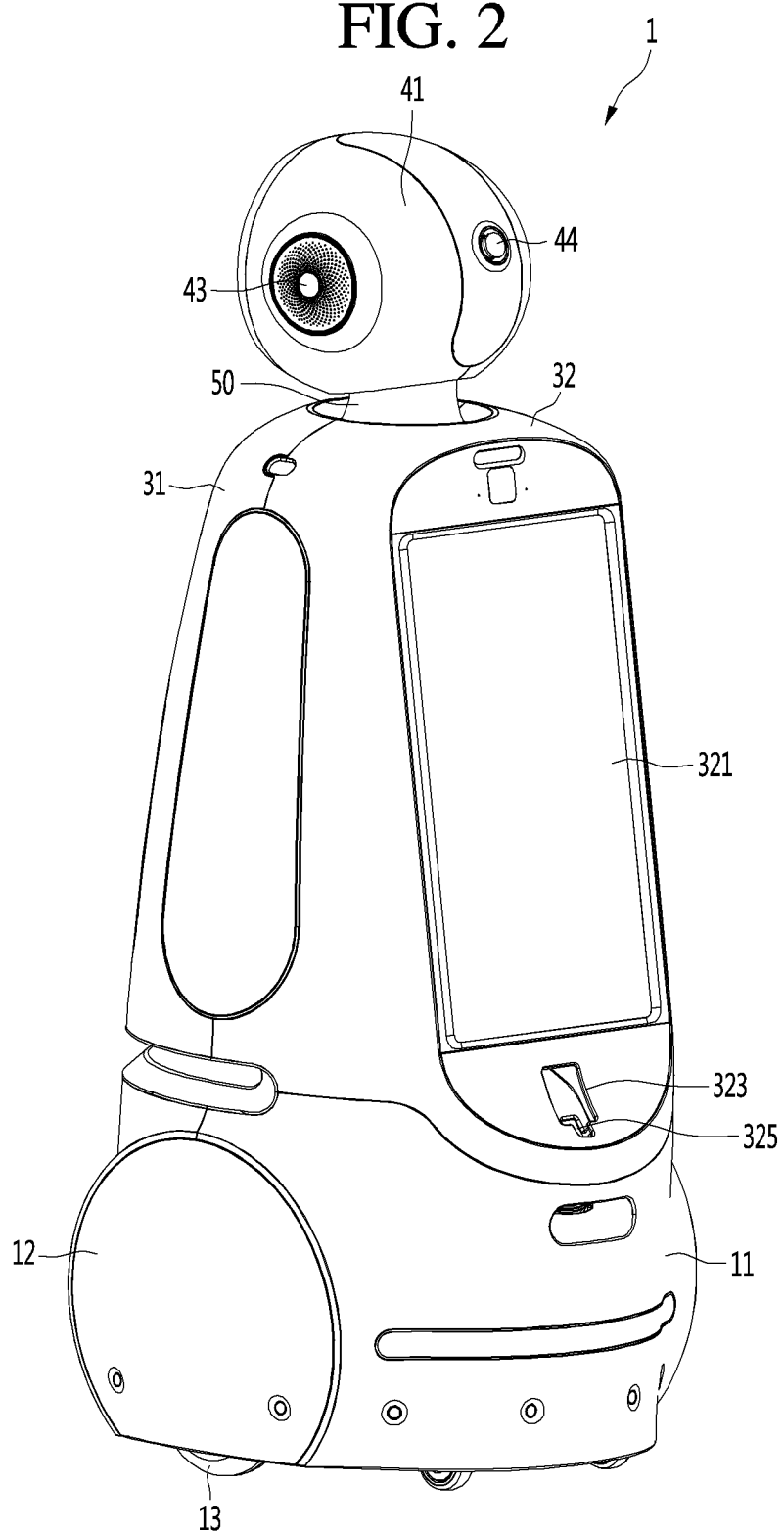
FIG. 2 is a rear perspective view illustrating an outer appearance of a guide robot, according to an embodiment of the present description.

FIG. 1 is a front perspective view illustrating an outer appearance of a guide robot according to an embodiment of the present description, and FIG. 2 is a rear perspective view illustrating an outer appearance of a guide robot according to an embodiment of the present description. Referring to FIGS. 1 and 2, according to an embodiment of the present description, a guide robot 1 includes a lower module 10 and an upper module 20 coupled to an upper portion of the lower module 10.

The lower module 10 includes a plurality of parts for autonomous driving and the upper module 20 includes a plurality of parts for performing a function of directions, an airport information providing function, and a trash can function for the user. In detail, the lower module 10 may withstand the load of the upper module 20 and may travel in direct contact with the ground surface. The lower module 10 may travel in one direction or another direction and rotate at 360 degrees, along a specified traveling route.

The lower module 10 may be provided therein with a wheel, a wheel motor, a light detection and ranging (LiDar) sensor, and a battery (not illustrated) for traveling, and parts such as the wheel 13, the wheel motor, the LiDar sensor, and the battery may be covered by a lower case (or first housing) 11 and a wheel case 12. Accordingly, since the internal parts of the lower module 10 are shielded by the lower case 11 and the wheel case 12, the internal parts may be protected from the outside and the robot may have a neat outer appearance.

The upper module 20 is installed at the upper portion of the lower module 10 to provide various services based on the eye height of a user. In detail, the upper module 20 includes a body part 30 disposed above the lower module 10, and a head part 40 rotatably disposed above the body part 30. In detail, the body part 30 may be formed to have a long length in the vertical direction, and may have a roly poly shape becoming slimmer upward. In addition, since the horizontal cross-sectional area of the body part 30 is formed to be smaller than the horizontal cross-sectional area of the lower module 10, the body part 30 has a structure stably supported above the lower module 10.

In addition, the body part 30 may be detachably coupled to the lower module 10. In other words, the lower portion of the body part 30 may be engaged with the upper portion of the lower module 10 while making contact with the upper portion of the lower module 10. According to occasions, the lower portion of the body part 30 may be separated from the upper portion of the lower module 10 and used. In this case, the lower module 10 may be used to carry a load or an object of a user.

Alternatively, the upper module 20 supporting different service may be coupled to the upper portion of the lower module 10. In this case, the guide robot 1 may provide services corresponding to not only the airport but different facilities. In other words, since the lower module 10 may be used without change and the upper module 20 may be changed to provide the different service, the lower module 10 may be shared.

In detail, the body part 30 includes a body case (or second housing) which forms an outer appearance thereof. The body case includes a front case 31 forming a front outer appearance of the body part 30 and a rear case 32 forming a rear outer appearance of the body 30

The front case 31 and the rear case 32 may cover the body part 30 in forward and backward directions. In this case, the front case 31 and the rear case 32 may be coupled to each other. In other words, since the front case 31 and the rear case 32 constitute two parts without being integrally formed, the assembling of the body part 30 may be easily performed.

In addition, the body part 30 further includes a garbage insertion part (or slot) 33 to insert garbage and a trash can assembly (or bin) 34 (see FIG. 3) to store the garbage inserted through the garbage insertion part 33. The garbage insertion part 33 serves as an entrance for moving garbage into the trash can assembly 34 disposed inside the body part 30. To this end, the garbage insertion part 33 may be positioned higher than the trash can assembly 34. Accordingly, the garbage inserted through the garbage insertion part 33 may be dropped down due to the self-load of the garbage and moved into the trash can assembly 34.

The garbage insertion part 33 is formed at one side of the body case. For example, the garbage insertion part 33 may be provided in the front case 31. In this case, a mounting opening 311 (see FIG. 4) is formed in the front case 31, and the garbage insertion part 33 may induce the insertion of garbage by opening or closing the mounting opening 311.

In addition, the body part 30 further includes a main door 318 for withdrawing the trash can assembly 34, which is disposed inside the body case, out of the body case. The main door 318 may be interpreted as a communication passage to empty the trash can assembly 34 when garbage is fully filled in the trash can assembly 34. In other words, when the main door 318 is open, the trash can assembly 34 may be exposed to the outside. Accordingly, the garbage may be removed by withdrawing the trash can assembly 34 out of the main door 318.

The garbage insertion part 318 is formed at one side of the body case. In other words, the main door 318 may be provided in the front case 31 at which the garbage insertion part 33 is positioned. The main door 318 is positioned lower than the garbage insertion part 33 to shield the trash can assembly 34.

In addition, the body part 30 further includes a display unit (or display) 321. The display unit 321 provides various visual information for a user. For example, when the display unit 321 provides information on an airport, the display unit 321 may provide airport gate query information, information on directions, or ticketing related services.

The display unit 321 is installed at one side of the body case. For example, the display unit 321 may be installed in the rear case 32. In other words, the display unit 321 may be disposed in a rearward direction of the guide robot 1 and may be disposed in opposition to the garbage insertion part 33.

The reason for disposing the display unit 321 in the rear portion of the guide robot 1 is that, when the guide robot 1 moves before a user along a set route to provide directions, a user is able to view the display unit 321 installed at the rear portion of the guide robot 1 while moving along the guide robot 1. In other words, even if the guide robot 1 travels for directions, the user may easily view information displayed on the display unit 321 while following the guide robot 1.

In addition, the reason for positioning the display unit 321 in opposition to the garbage insertion part 33 is that the garbage insertion part 33 may be stained with foreign matters in the process of throwing garbage through the garbage insertion part 33 or the garbage stored in the trash can assembly 34 may produce bed odor. Therefore, according to the present description, to minimize the feeling of aversion against the foreign matters or the bed odor in the process that the user uses the display unit 321, the display unit 321 is spaced apart from the garbage insertion part 33 as far as possible.

Hereinafter, a direction will be defined. When viewed based on FIG. 1, a direction that the garbage insertion part 33 faces is defined as "forward direction". When viewed based on FIG. 2, a direction that the display unit 321 faces is defined as "rearward direction". In the present description, the forward direction is a direction opposite to the rearward direction.

Meanwhile, the head part 40 is disposed above the body part 30. The head part 40 is coupled to an upper end portion of the body part 30 and is rotatably installed. The head part 40 is rotatable independently from the body part 30. The head part 40 may rotate at a predetermined angle in one direction (left direction) or an opposite direction (right direction). In this case, the head part 40 and the body part 30 may be connected with each other by a connection part 50.

A lower end portion of the connection part (or neck) 50 may be fixed into the upper end portion of the body part 30 and an upper end portion of the connection part 50 may support the head part 40. However, in the head part 40, a head case (or third housing) 41 forming an outer appearance of the head part 40 rotates independently from the connection part 50. In other words, the head case 41 may be spaced apart from the connection part 50 by a predetermined distance without being contact with the connection part 50. Accordingly, in the state that the connection part 50 is stopped, only the head part 40 may rotate.

The head part 40 includes an operating unit (or interface device) 42. The operating unit 42 performs both a function of receiving a command from a user and a function of displaying service information. For example, the operating unit 42 may include a touch monitor to receive a touch input from the user. The touch monitor may include a touch panel configured to receive the input of the user and a display to display output information. The operating unit 42 may have a substantially circular or oval shape and may be disposed on the front surface of the head case 41.

In addition, the head part 40 further includes a speaker 43. The speaker 43 outputs, in the form of a voice, airport guide information. At least one speaker 43 may be provided, or preferably, two speakers 43 may be provided. For example, the speakers 43 may be disposed at opposite sides of the head case 41, respectively, while being spaced apart from each other.

In addition, the head part 40 may further include an emergency operation button 44. The emergency operation button 44 is to instantly stop the operation of the guide robot 1 when the guide robot 1 is stopped or is travelling. For example, the emergency operation button 44 may be positioned at the rear portion of the head case 41 such that the emergency operation button 44 is easily operated even if the guide robot 1 travels in the forward direction.

Figure 3:
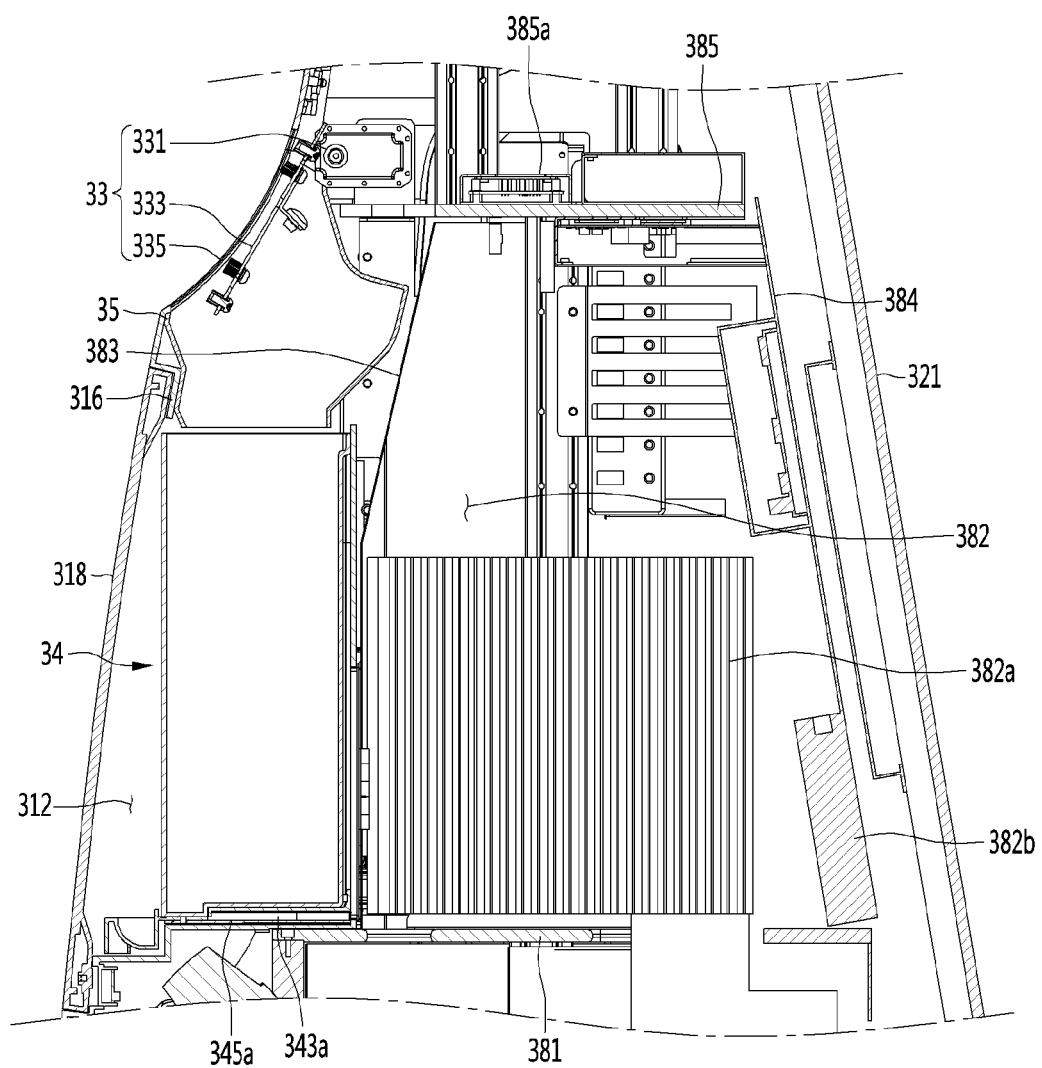
FIG. 3 is a longitudinal sectional view taken along line II-II' of FIG. 1.
Figure 4:
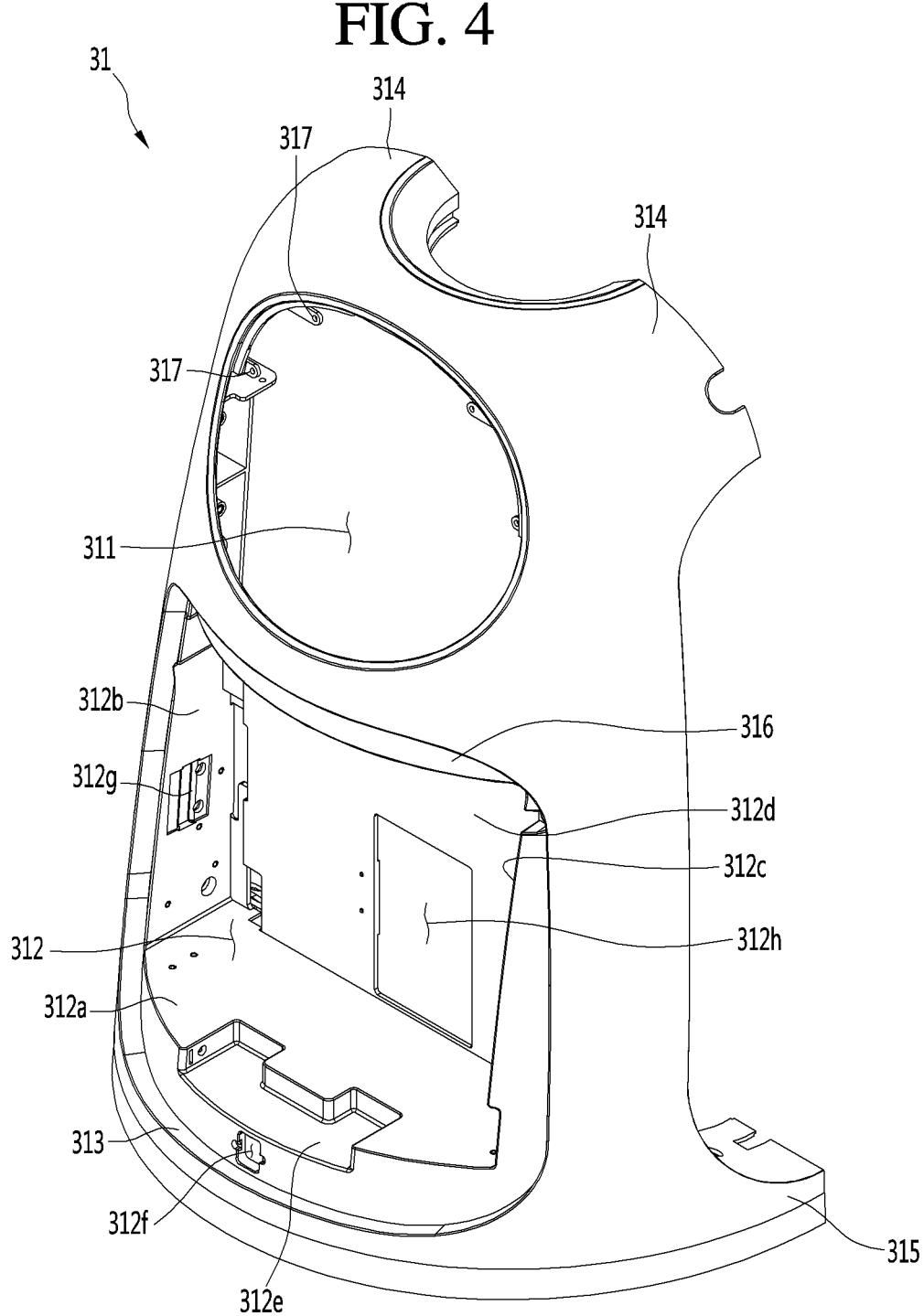
FIG. 4 is a front perspective view illustrating a front case according to an embodiment of the present description.
Figure 5:
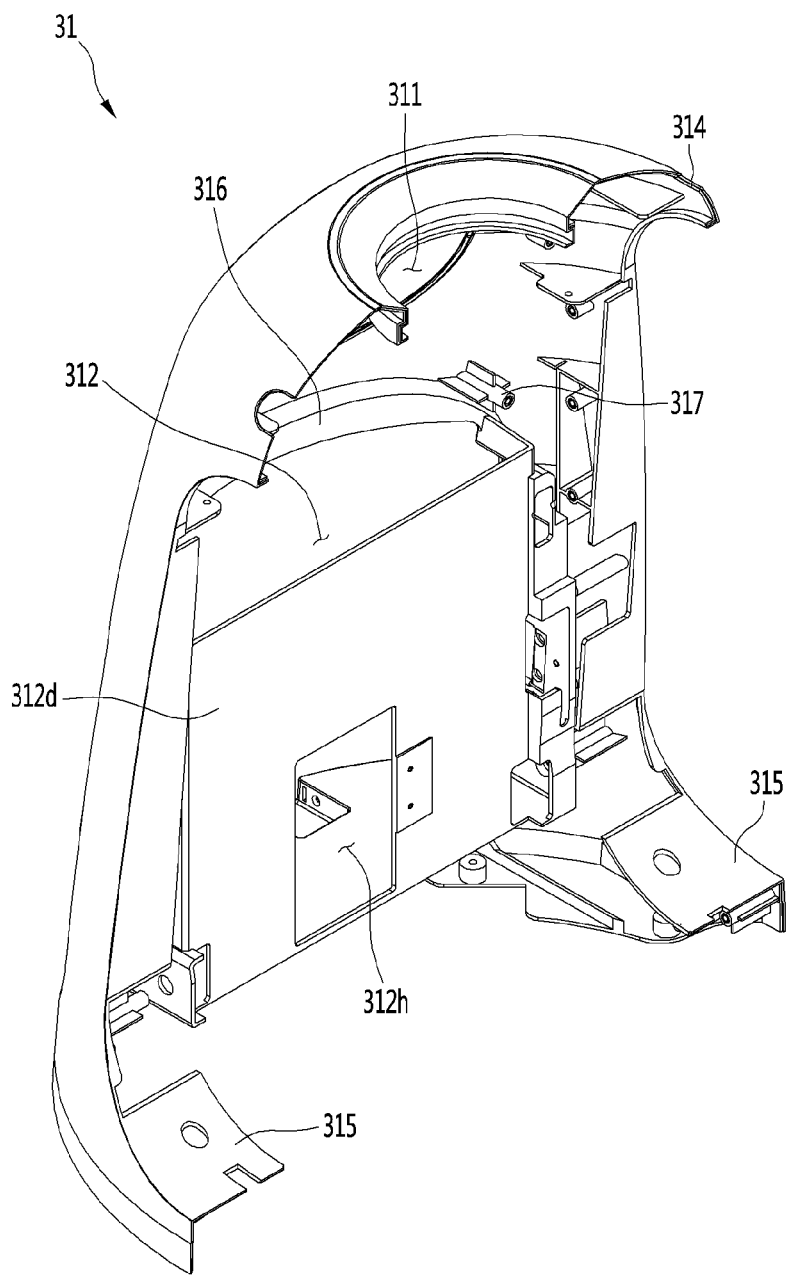
FIG. 5 is a rear perspective view illustrating a front case according to an embodiment of the present description.

FIG. 3 is a longitudinal sectional view taken along line II-II' of FIG. 1, FIG. 4 is a front perspective view illustrating a front case according to an embodiment of the present description, and FIG. 5 is a rear perspective view illustrating a front case according to an embodiment of the present description.

Referring to FIGS. 3 to 5, according to an embodiment of the present description, the body part 30 includes a first horizontal frame (or first plate) 381 disposed inside the body case. The first horizontal frame 381 may be disposed at an inner lower portion of the body case to support a plurality of parts. The first horizontal frame 381 may have the shape of a thin plate having a predetermined area. The first horizontal frame 381 may be horizontally disposed inside the body case.

In addition, the body part 30 may further include a first inner case 383 and a second inner case 384 to from an electronic part chamber 382 The first inner case 383 and the second inner case 384 may be collectively referred to as "inner case". The first inner case 383 and the second inner case 384 stand upright on the top surface of the first horizontal frame 381 to form the electronic part chamber 382 having a predetermined space therein.

The first inner case 383 may be mounted on a front edge of the top surface of the first horizontal frame 381 and the second inner case 384 may be mounted on a rear edge of the top surface of the first horizontal frame 381. In addition, the first inner case 383 is coupled to the second inner case 384 to form the electronic part chamber 382 therein.

For example, the first inner case 383 may be formed in the shape of a substantially C shape when viewed in a horizontal sectional surface and may have a top surface and a bottom surface which are open. In addition, the second inner case 384 may have a shape symmetrical to the first inner case 383. Accordingly, opposite end portions of the first inner case 383 are coupled to opposite end positions of the second inner case 384 to form the electronic part chamber 382. In this case, the upper end portion of the first inner case 383 and the upper end portion of the second inner case 384 may be coupled to each other horizontally to each other without a step difference therebetween.

The electronic part chamber 382 may include a control part 382a to control the overall operation of the guide robot 1 and a communication part 382b allowing the guide robot 1 to communicate with an external device. The control part 382a and the communication part 382b may be disposed on the top surface of the first horizontal frame 381 or may be fixed by a separate bracket.

In addition, the second body part 30 may further include a second horizontal frame (or second plate) 385 disposed inside the body case. The second horizontal frame 385 may be disposed at an inner upper portion of the body case to support a plurality of parts. The second horizontal frame 385 may have the shape of a thin plate having a predetermined area smaller than the area of the first horizontal frame 381. The second horizontal frame 385 may be horizontally disposed inside the body case.

In detail, the second horizontal frame 385 may be placed on the upper end portions of the first and second inner cases 383 and 384. The second horizontal frame 385 may be installed to shield the open top surfaces of the first and second inner cases 383 and 384.

Through the above configuration, the electronic part chamber 382 may have a structure shielded by the first horizontal frame 381, the first and second inner cases 383 and 384, and the second horizontal frame 385. Accordingly, electromagnetic waves or noise produced by a plurality of electronic parts disposed in the electronic part chamber 382 may be effectively blocked.

The second horizontal frame 385 may be provided thereon with a control part 385*a* for the function of the guide robot 1. In addition, a driving motor assembly 331 may be provided at a front edge of the second horizontal frame 385 to provide driving force for opening or closing the garbage insertion part 33.

Meanwhile, the trash can assembly 34 is disposed in front of the first inner case 383. The trash can assembly 34 is disposed in a storage chamber 312 provided by the front case 31. In addition, a garbage guide part 35 is disposed above the trash can assembly 34 to guide the movement of garbage inserted through the garbage insertion part 33.

The garbage insertion part 33 serves as an entrance for inserting garbage and is disposed at the upper portion of the body part 30, that is, the upper portion of the front case 31. In addition, the trash can assembly 34 contains garbage introduced through the garbage insertion part 33 and is disposed under the garbage insertion part 33.

The garbage insertion part 33 is provided to shield the mounting opening 311 formed in the outer surface of the front case 31 to open or close a portion of the mounting opening 311. In other words, the garbage insertion part 33 opens or closes the mounting opening 311 to provide an inlet for inserting garbage.

In this case, at least a portion of the garbage insertion part 33 is open by rotating outward of the front case 31 through hinge coupling. Unlike, at least a portion of the garbage insertion part 33 may be open by rotating inward of the front case 31 without rotating outward of the front case 31. In addition, the rotation direction or the rotation angle of the garbage insertion part 33 may be variously designed.

For example, when the guide robot 1 receives a command of starting insertion of garbage from a user, the garbage insertion part 33 may be rotated to face the user. In addition, the guide robot 1 may open the garbage insertion part 33 to induce the user to insert garbage therein. Thereafter, when a predetermined time elapses or a command of terminating the insertion of the garbage is received, the guide robot 1 may close the garbage insertion part 33. However, the present description is not limited thereto, and various scenarios may be applied for opening the garbage insertion part 33.

Meanwhile, the trash can assembly 34 is disposed inside the body part 30 and, in detail, is seated in the storage chamber 312 formed in the front case 31. The trash can assembly 34 may be positioned under the garbage insertion part 33 and may have, for example, a sealed shape that the top surface of the trash can assembly 34 is open. In other words, the garbage inserted through the garbage insertion part 33 may pass through the garbage guide part 35 and be dropped through the opened top surface of the trash can assembly 34.

The garbage guide part 35 guides garbage inserted through the garbage insertion part 33 such that the garbage is easily dropped into the trash can assembly 34. The garbage guide part 35 is interposed between the garbage insertion part 33 and the trash can assembly 34.

In this case, a lower portion of the garbage guide part 35 may be disposed to overlaps with an upper portion of the trash can assembly 34 in a vertical direction. In addition, at least a portion of the upper portion of the garbage guide part 35 may be connected with at least a portion of the lower portion of the garbage insertion part 33. Accordingly, the garbage inserted through the garbage insertion part 33 may be prevented from being out of the trash can assembly 34.

Hereinafter, the front case 31 according to an embodiment of the present description will be described in detail. The front case 31 is a part forming the front outer appearance of the body part 30, and the trash can assembly 34 is mounted in the front case 31. The front case 31 may be coupled to the rear case 32 forming the rear outer appearance of the body part 30. In addition, when the front case 31 is coupled to the rear case 32, the front case 31 and the rear case 32 form a cylindrical shape becoming slimmer upward.

In detail, a door mounting part 313 is formed in the front case 31 to mount the main door 318. The door mounting part 313 is formed by recessing the front case 31 by a predetermined depth rearward from the front surface of the front case 31. The door mounting part 313 may be shielded by the main door 318, and at least a portion of the door mounting part 313 may be open or closed by opening or closing the main door 318.

In addition, the front case 31 is formed therein with the mounting opening 311 in which the garbage insertion part 33 is mounted and the storage chamber 312 in which the trash can assembly 34 is mounted. The mounting opening 311 is positioned above the door mounting part 313, and the storage chamber 312 is positioned inside the door mounting part 313. In other words, the mounting opening 311 may be positioned above the storage chamber 312.

At least a portion of the mounting opening 311 may be open or closed by the garbage insertion part 33. Accordingly, the garbage inserted through the garbage insertion part 33 may be easily dropped into the trash can assembly 34 positioned under the garbage insertion part 33.

The storage chamber 312 may be formed to be recessed rearward from the front surface of the front case 31. In detail, the storage chamber 312 may be formed as at least a portion of the door mounting part 313 is further recessed. The storage chamber 312 provides a space in which the trash can assembly 34 is detachably mounted.

For example, the storage chamber 312 may have a hexahedral space, the front surface and the top surface of which are open. According to the present embodiment, the storage chamber 312 may include a bottom surface 312*a*, and a first lateral side 312*b*, a second lateral side 312*c*, and a rear surface 312*d* connected with the bottom surface 312*a*.

When viewed based on FIG. 4, the first lateral side 312*b* refers to a left sidewall of the storage chamber 312 and the second lateral side 312*c* refers to a right sidewall of the storage chamber 312. The first lateral side 312*b* and the second lateral side 312*c* may face each other.

The rear surface 312*d* of the storage chamber 312 may be injection-molded integrally with the front case 31. In addition, alternatively, the rear surface 312*d* of the storage chamber 312 may be provided by coupling a rear portion of the front case 31 with a separate partition plate. In this case, the separate partition plate may be mounted detachably from the rear portion of the front case 31. Accordingly, since the partition plate forming the rear surface 312*d* of the storage chamber 312 is additionally separated, the inner part of the storage chamber 312 may be easily cleaned up.

The bottom surface 312*a* of the storage chamber 312 has a seating groove 312*e* in which the lower portion of the trash can assembly 34 is seated. The seating groove 312*e* may be recessed by a predetermined depth from the bottom surface 312*e* of the storage chamber 312.

In addition, a sensor groove 312*f* is formed under the seating groove 312*e* such that a door sensor (not illustrated) is installed in the sensor groove 312*f* to sense the opening or closing of the door 318. The sensor groove 312*f* may be disposed adjacent to the door mounting part 313.

The first lateral side 312b of the storage chamber 312 is formed therein with a coupling hole 312g coupled to a sensor bracket for mounting a sensing member to sense an amount of garbage stored in the trash can assembly 34. Similarly, the second lateral side 312c of the storage chamber 312 is formed therein with a coupling hole (not illustrated) coupled to a sensor bracket for mounting a sensing member to sense an amount of garbage stored in the trash can assembly 34.

The rear surface 312d of the storage chamber 312 is formed therein with a door opening 312h for mounting a sub-door to be described below. The door opening 312h may be interpreted as a communication passage to allow the storage chamber 312 to communicate with the electronic part chamber 382.

In addition, the front case 31 further includes case coupling parts 314 and 315 formed as portions of front edges extend in the rearward direction. The case coupling parts 314 and 315, which are coupled to the rear case 32, may be formed at the edge of the front case 31. The case coupling parts 314 and 315 include a pair of upper coupling parts 314 positioned at the upper portion of the front case 31 and a pair of lower coupling parts 315 positioned at the lower portion of the front case 31. The pair of upper coupling parts 314 and the pair of lower coupling parts 315 may be coupled to a plurality of coupling parts (not illustrated) extending from the rear case 32.

In addition, the front case 31 further includes a step part 316 for inserting the garbage guide part 35. The step part 316 may be formed as the upper edge of the door mounting part 313 is recessed reward. Alternatively, the step part 316 may be formed as the rear surface of the front case 31 extends reward.

In other words, the step part 316 may have a form of protruding rearward from the front case 31. For example, although the step part 316 has a curved shape, the present description is not limited thereto. The garbage guide part 35 may be inserted into the step structure of the step part 316 or locked and fixed to the step shape of the step part 316.

Figure 6:
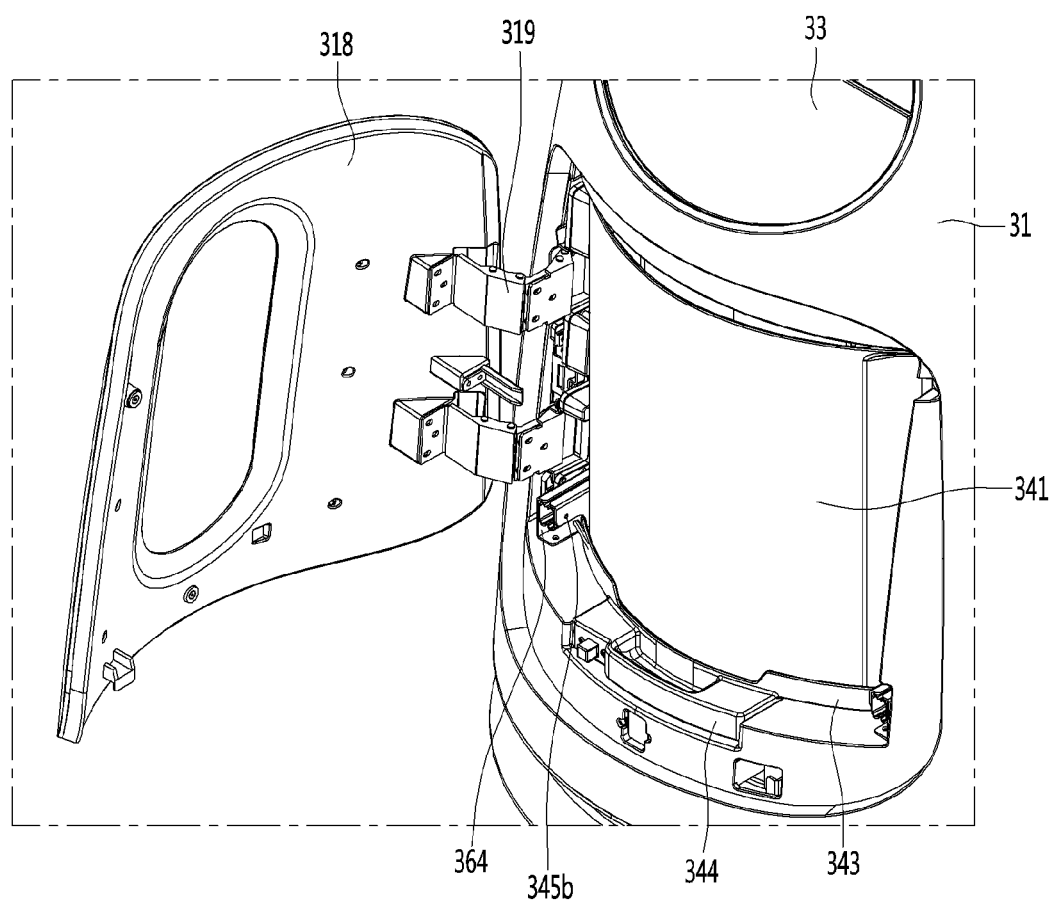
FIG. 6 is a view illustrating a body part having a main door, which is open according to an embodiment of the present description.
Figure 7:
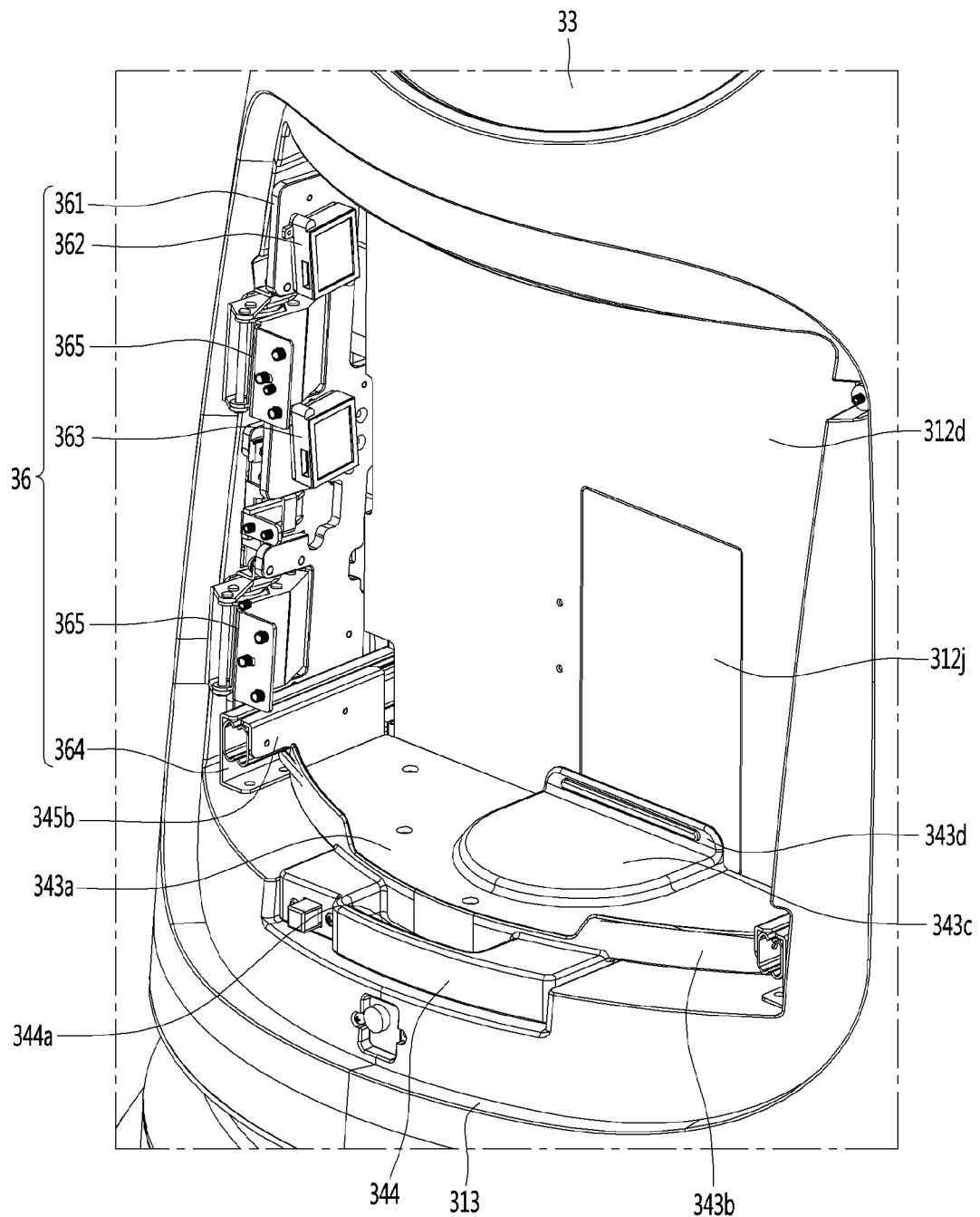
FIG. 7 is a view illustrating a storage chamber according to an embodiment of the present description.
Figure 8:
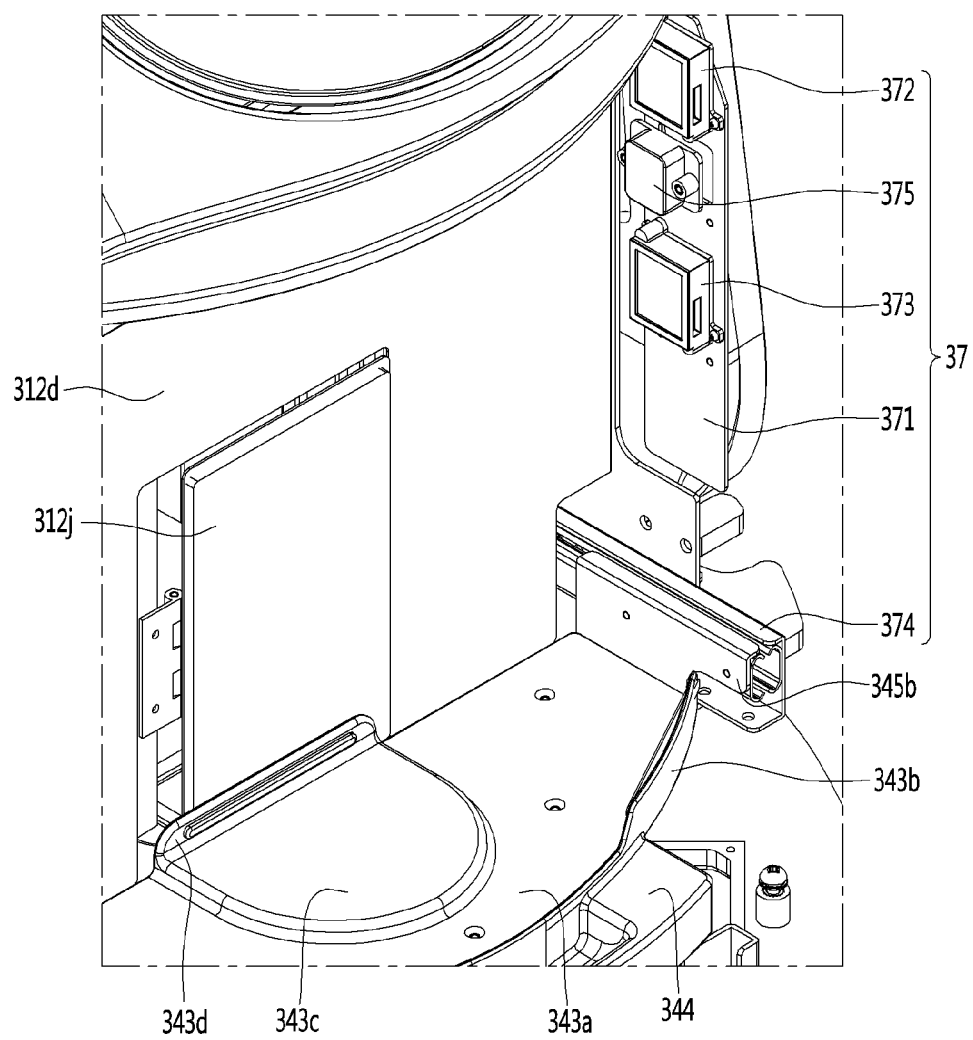
FIG. 8 is a view illustrating the storage chamber viewed in another direction according to an embodiment of the present description.

FIG. 6 is a view illustrating a body part having a main door, which is open according to an embodiment of the present description, FIG. 7 is a view illustrating a storage chamber, according to an embodiment of the present description, and FIG. 8 is a view illustrating the storage chamber viewed in another direction according to an embodiment of the present description. Referring to FIGS. 6 to 8, the main door 318 is mounted on the door mounting part 313 of the front case 31 and coupled to a hinge coupling part (or hinge) 319 coupled to an inner part of the storage chamber 312. Accordingly, the storage chamber 312 may be selectively shielded as the main door 318 is open or closed.

When the main door 318 is open, the trash can assembly 34 is exposed to the outside and a user may separate the trash can assembly 34. In detail, the trash can assembly 34 includes a garbage storage part 341 to store garbage, a mounting part 343 to mount the garbage storage part 341, and a bracket 345 to support the mounting part 343.

The garbage storage part 341 has a polyhedral shape having a top surface which is open. The garbage storage part 341 may be provided in a sealed form and may be placed right under the garbage guide part 35.

The mounting part 343 may be provided in the form of supporting the bottom surface of the garbage storage part 341 to support the garbage storage part 341. The mounting part 343 may be provided in a fan form. In detail, the mounting part 343 includes a seating surface 343a forming a plane on which the garbage storage part 341 is seated. The seating surface 343a may be provided in the shape corresponding to the shape of the bottom surface of the garbage storage part 341 to support the garbage storage part 341. The seating surface 343a may be provided, for example, in a fan form.

In addition, the mounting part 343 further includes a guide rib 343b extending upward from the seating surface 343a. The guide rib 343b extends upward from a portion of an edge of the seating surface 343a to guide the mounting position of the garbage storage part 341.

At least one of the guide rib 343b may be formed on the front end portion of the seating surface 343a. For example, the guide ribs 343b may be formed on opposite sides of the front end portions of the seating surface 343a while being spaced apart from each other. In addition, when the garbage storage part 341 is seated on the seating surface 343a, the guide rib 343b may make contact with the front surface of the garbage storage part 341.

In addition, the mounting part 343 further includes an insertion part 343c inserted into a portion of the garbage storage part 341. The insertion part 343c is formed as a portion of the top surface of the seating surface 343a protrudes upward. For example, the insertion part 343c may protrude with a predetermined area from the central point of the seating surface 343a and may be inserted into the bottom surface of the garbage storage part 341.

In addition, the mounting part 343 may further include a rear rib 343d to support the rear surface of the garbage storage part 341. The rear rib 343d may be formed at a rear end portion of the insertion part 343c. For example, the rear rib 343d may protrude in a straight line along the rear end portion of the insertion part 343c. In addition, when the garbage storage part 341 is seated on the seating surface 343a, the rear rib 343d may make contact with and/or inserted into the rear surface of the garbage storage part 341. Accordingly, through the above structure, even if vibration or shaking occurs in the state that the garbage storage part 341 is seated on the seating surface 343a, the garbage storage part 341 may be prevented from being collapsed or detached.

In addition, the mounting part 343 further includes a grip part 344. The grip part 344 is formed by further extending in the forward direction from the front surface of the mounting part 343. The grip part 344 may be interpreted as a component to easily withdraw the garbage storage part 341 received in the storage chamber 312. To this end, the grip part 344 may have a grip groove 344a which may be gripped by fingers of a user.

The bracket 345 may support the mounting part 343 and may be provided to withdraw the trash can assembly 34 at a time. The bracket 345 may be disposed on the bottom surface 312a of the storage chamber 312. In detail, the bracket 345 may include a base 345a (see FIG. 3) to support the mounting part 343 and a pair of rail guides 345b provided at opposite sides of the base 343a.

The base 345a is placed horizontally to the bottom surface 312a of the storage chamber 312 and the pair of rail guides 345b are coupled to rail assemblies 374 provided at the opposite lateral sides 312b and 312c of the storage chamber 312. Accordingly, the rail guide 345b provided in the bracket 345 slides in forward and rearward directions along the rail assembly 374.

Through the above configuration, the user may easily withdraw the garbage storage part 341 through the grip part 344 after opening the main door 318. Accordingly, the user may easily empty garbage stored in the garbage storage part 341.

In addition, the body part 30 may further include sensor bracket assemblies 36 and 37 in which a plurality of sensors are mounted. The sensor bracket assemblies 36 and 37 may be provided inside the storage chamber 312. In detail, the sensor bracket assemblies 36 and 37 are provided in pair and may be mounted on opposite lateral sides 312b and 312c of the storage chamber 312, respectively.

According to the present embodiment, the sensor bracket assemblies 36 and 37 may include a first sensor bracket assembly 36 mounted on the first lateral side 312b of the storage chamber 312, and a second sensor bracket assembly 37 mounted on the second lateral side 312c of the storage chamber 312. In more detail, the first and second sensor bracket assemblies 36 and 37 include first and second sensor brackets 361 and 372 having the plate shape and longitudinally extending in a vertical direction.

The first sensor bracket 361 is fixed to the first lateral side 312b of the storage chamber 312 and the second sensor bracket 371 is fixed to the second lateral side 312c of the storage chamber 312. For example, the first and second sensor brackets 361 and 371 may be fixed on the side surfaces of the storage chamber 312 by coupling members.

In addition, the first and second sensor bracket assemblies 36 and 37 further include first sensing members 362 and 372 to sense an amount of garbage stored in the garbage storage part 341. For example, the first sensing members 362 and 372 may include Time of Flight (TOF) type sensors to sense an amount of garbage stored in the garbage storage part 341. In other words, the first sensing members 362 and 372 may sense an amount of garbage filled in the garbage insertion part 33 by using time taken until the first sensing members 362 and 372 receive a signal of infrared light, an ultrasonic wave, or a laser after transmitting the signal.

The first sensing members 362 and 372 include a first transmitter 362 to transmit the signal and a first receiver 372 spaced apart from the first transmitter 362 to receive the signal of the first transmitter 36. In detail, the first transmitter 362 is mounted on the first sensor bracket 361 and the first receiver 372 is mounted on the second sensor bracket 371. The first transmitter 362 and the first receiver 372 may be provided to face each other.

Each of the first transmitter 362 and the first receiver 372 may be disposed above a line of dividing each of the first sensor bracket 361 and the second sensor bracket 371 into two parts in a vertical direction. According to another aspect, each of the first transmitter 362 and the first receiver 372 may be disposed in a sensor bracket corresponding to an upper part about a line of dividing the garbage storage part 341 into two parts in the vertical direction.

According to the present embodiment, the first transmitter 362 and the first receiver 372 may be mounted at a height corresponding to 80% of the height of the upper most end of the garbage storage part 341. This is necessary to generate a signal for empting the garbage storage part 341, when garbage is filled to some degree in the garbage storage part 341.

In addition, the first and second sensor bracket assemblies 36 and 37 further include second sensing members 363 and 373 to more exactly determine an amount of garbage stored in the garbage storage part 341. The second sensing members 363 and 373 may be interpreted as the same as the first sensing members 362 and 372. However, the second sensing members 363 and 373 are characterized in that the second sensing members 363 and 373 are mounted to be lower than the first sensing members 362 and 372.

According to the present embodiment, for example, the second sensing members 363 and 373 may be mounted at the height corresponding to 50% of the height of the upper most end of the garbage storage part 341. This is necessary to determine a situation that a large foreign substance is caught and sensed at an upper space of the garbage storage part 341 in the state that the garbage is not filled in the lower space of the garbage storage part 341.

In other words, generally, if garbage is started to be filled in the garbage storage part 341, an amount of garbage is sensed by the second sensing members 363 and 373 and then sensed by the first sensing members 362 and 372. However, when an amount of garbage is sensed only by the first sensing members 362 and 372 without sensing the amount of garbage by the second sensing members 363 and 373, it may be determined that the sensors are failed or the foreign. substance is caught.

Through the above component, an amount of garbage stored in the garbage storage part 341 may be more exactly sensed and the failure of the sensor or the caught foreign substance may be determined. Accordingly, the overflowing of the garbage or the failure of the sensor may be predicted in advance, so proper countermeasures may be made.

In addition, the first and second sensor bracket assemblies 36 and 37 may further include a pair of rail assemblies 364 and 374 to guide the introduction and the withdrawal of the trash can assembly 34. The rail assemblies 364 and 374 may be provided at the lower end portions of the first and second sensor brackets 361 and 371. Accordingly, the rail guides 345b provided at opposite sides of the bracket 345 may slide in forward and rearward directions along the rail assemblies 364 and 374.

In addition, the first sensor bracket assembly 36 may further include a pair of hinge assemblies 365 hinged to the main door 318. The pair of hinge assemblies 365 is mounted on the first sensor bracket 361 such that the main door 318 is rotatable. In detail, each of the hinge assemblies 365 may be coupled to the first sensor bracket 361 at one side thereof and may be coupled to the hinge coupling part 319 of the main door 318 at an opposite side thereof.

The pair of hinge assemblies 365 may be disposed on the first sensor bracket 361 and may be spaced apart from each other in a vertical direction. In this case, the hinge assemblies 365 may be fixed on a surface opposite to the surface on which the first and second transmitters 362 and 363 are mounted.

In other words, the first and second transmitters 362 and 363 are mounted on a surface, which faces the inner part of the storage chamber 312, of the first sensor bracket 361, and the pair of hinge assemblies 365 are mounted on a surface, which faces the first lateral side 312b of the storage chamber 312, of the first sensor bracket 361.

The hinge assembly 365 may be mounted based on the installation area of the first sensor bracket 361. In addition, the hinge assembly 365 may be configured without interfering with the sensing operations of the first and second transmitters 362 and 363.

In the present embodiment, one of the pair of hinge assemblies 365 may be interposed between the first transmitter 362 and the second transmitter 363, and a remaining one may be interposed between the second transmitter 363 and the rail assembly 364. Accordingly, through the above configuration, the available installation area of the first sensor bracket 361 may be efficiently utilized and the mutually interference in operation between parts may be minimized.

In addition, the second sensor bracket assembly 37 may further include a mounting sensor 375 to sense the mounting of the garbage storage part 341. The mounting sensor 375 may be mounted at one side of the second sensor bracket 371. In detail, the mounting sensor 375 may be mounted on a portion of the second sensor bracket 371 between the first receiver 372 and the second receiver 373.

The mounting sensor 375 is disposed adjacent to a lateral side of the garbage storage part 341. In the present embodiment, the mounting sensor 375 may be a Hall integrated circuit (IC) sensor or other type of Hall sensor. In other words, when the garbage storage part 341 is mounted in the mounting part 343, the mounting sensor 375 may determine whether the garbage storage part 341 is exactly mounted, by sensing a magnet (not illustrated) provided on a lateral side of the garbage storage part 341. In addition, when the garbage storage part 341 is not exactly placed, an alarm sound rings such that a user notices this.

Accordingly, through the above configuration, since it may be determined that the garbage storage part 341 is placed at a correct position of the storage chamber 312, the garbage inserted through the garbage insertion part 33 may be prevented from being out of the garbage storage part 341.

Meanwhile, the body part 30 further includes a sub-door 312j provided inside the storage chamber 312. The sub-door 312j is mounted to open or close a door 312h formed in the rear surface 312d of the storage chamber 312. For example, the sub-door 312j is hinged to the rear surface 312d of the storage chamber 312 to be rotatably mounted. A user may open the sub-door 312j to maintain or manage parts provided inside the electronic part chamber 382 or to replace a failed part with new one.

Figure 9:
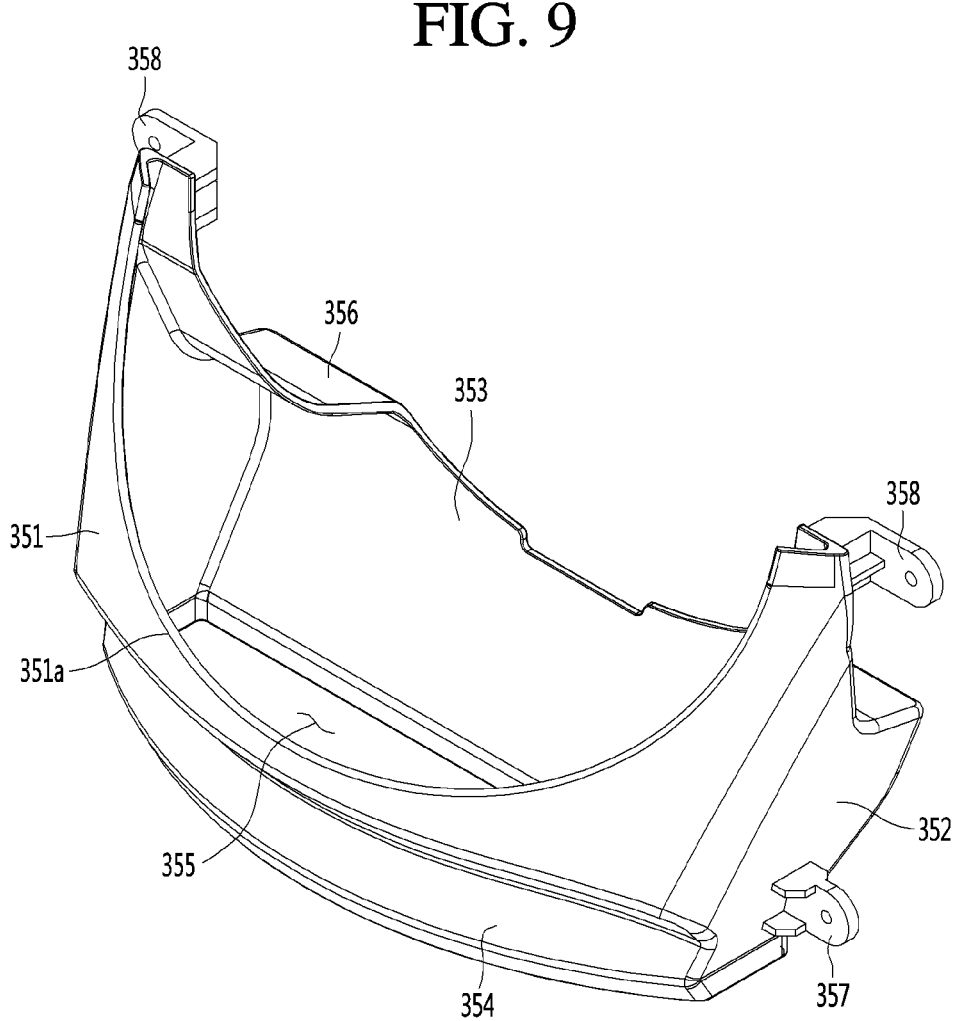
FIG. 9 is a front perspective view illustrating a garbage guide part according to an embodiment of the present description.
Figure 10:
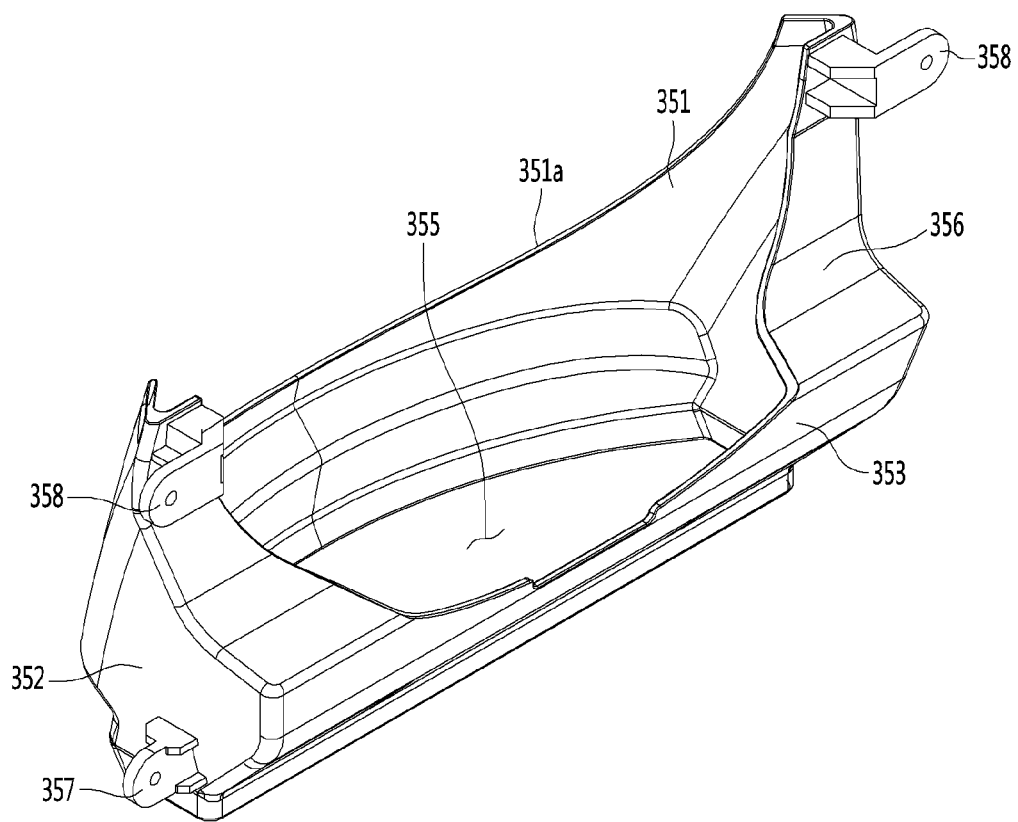
FIG. 10 is a rear perspective view illustrating the garbage guide part according to an embodiment of the present description.

FIG. 9 is a front perspective view illustrating the garbage guide part according to an embodiment of the present description, and FIG. 10 is a rear perspective view illustrating the garbage guide part according to an embodiment of the present description. Referring to FIGS. 3, 9, and 10, according to the embodiment of the present description, the garbage guide part 35 guides garbage, which is inserted through the garbage insertion part 33, such that the garbage is easily dropped into the garbage storage part 341 of the trash can assembly 34. The garbage guide part 35 is mounted inside the front case 31.

In detail, the garbage guide part 35 includes a front surface part 351 having a front opening 351a allowing garbage to pass through the front surface, a pair of lateral side parts 352 extending in the rearward direction from opposite sides of the front surface part 351 and a rear surface part 353 connecting end portions of the pair of lateral side surfaces 353 with each other.

The front opening 351a may be interpreted as an entrance for passing garbage which has inserted through the mounting opening 311 of the front case 31. The front opening 351a may have, for example, a circular shape or may have a diameter greater than a diameter of the mounting opening 311. In addition, at least a portion of the front surface part 351 may be supported to an inner surface of the front case 31 while making contact with the inner surface of the front case 31. In this case, the front surface part 351 may be coupled to an inner part of the front case 31 such that the front opening 351a covers at least a portion of the mounting opening 311.

In the present embodiment, the front surface part 351 may be disposed inside the front case 31 along a lower circumference of the mounting opening 311. Accordingly, the garbage inserted through the mounting opening 311 may be easily moved into the garbage guide part 35.

In addition, the garbage guide part 35 further includes a locking part (or locking extension) 354 to be inserted into the front case 31. The locking part 354 is formed to extend downward from the front surface part 351. For example, the locking part 354 may be formed as a lower portion of the front surface part 351 extends downward and is bent inward several times.

When the garbage guide part 35 is coupled to the front case 31, the locking part 354 may be interpreted as a component inserted into the step part 316 (see FIG. 3) of the front case 31. In other words, the locking part 354 may be formed corresponding to the shape of a step of the step part 316 and may be supported to at least a portion of the step part 316 while making contact with the at least a portion of the step part 316.

Meanwhile, lower end portions of the front surface part 351, the lateral side parts 352, and the rear surface part 353 are connected with each other to form a bottom surface opening 355 having a predetermined area. The bottom surface opening 355 may have a shape corresponding to the open top surface of the garbage storage part 341. The bottom surface opening 355 may have an area narrower than the open top surface of the garbage storage part 341.

The bottom surface opening 355 may be positioned right over the garbage storage part 341. Accordingly, the garbage, which has passed the bottom surface opening 355, may be stably dropped into the garbage storage part 341.

In addition, the garbage guide part 35 further includes a blocking part (or blocking surface) 356 to prevent garbage, which has passed the front surface opening 351a, from going rearward from the garbage guide part 35. The blocking part 356 is formed to be connected with the rear surface part 353 and the pair of lateral side parts 352. In detail, the blocking part 356 may be formed to extend from a portion of an upper end portion of the rear surface part 353 till an upper end portion of the lateral side parts 352. According to another aspect, the blocking part 356 may be formed to extend inward from the garbage guide part 35 from at least one of the pair of lateral side parts 352 and the rear surface part 353.

For example, in the present embodiment, the blocking part 356 may be formed as opposite upper end portions of the rear surface part 353 extend to be rounded and are connected with upper end portions of the lateral side parts 352. However, the present description is not limited thereto. For example, the blocking part 356 may be formed as the entire upper end portion of the rear surface part 353 extend along the lateral side parts 352.

The above configuration may prevent the garbage, which has passed through the front opening 351a, from colliding with the blocking part 356 to move rearward from the rear surface part 353. Accordingly, the garbage inserted through the garbage insertion part 33 may be prevented from being out of the trash can assembly 34.

In addition, the garbage guide part 35 may further include a plurality of mounting ribs 357 and 358 such that the garbage guide part 35 is mounted on the front case 31. The mounting ribs 357 and 358 are coupled to coupling parts (or coupling tabs) 317 provided inside the front case 31 by coupling members. The mounting ribs 357 and 358 may include a lower mounting rib 357 formed on the lateral side part 352 and an upper mounting rib 358 formed on the blocking part 356. The lower mounting rib 357 and the upper mounting rib 358 may be provided at positions corresponding to the coupling parts 317 of the front case 31.

Figure 11:
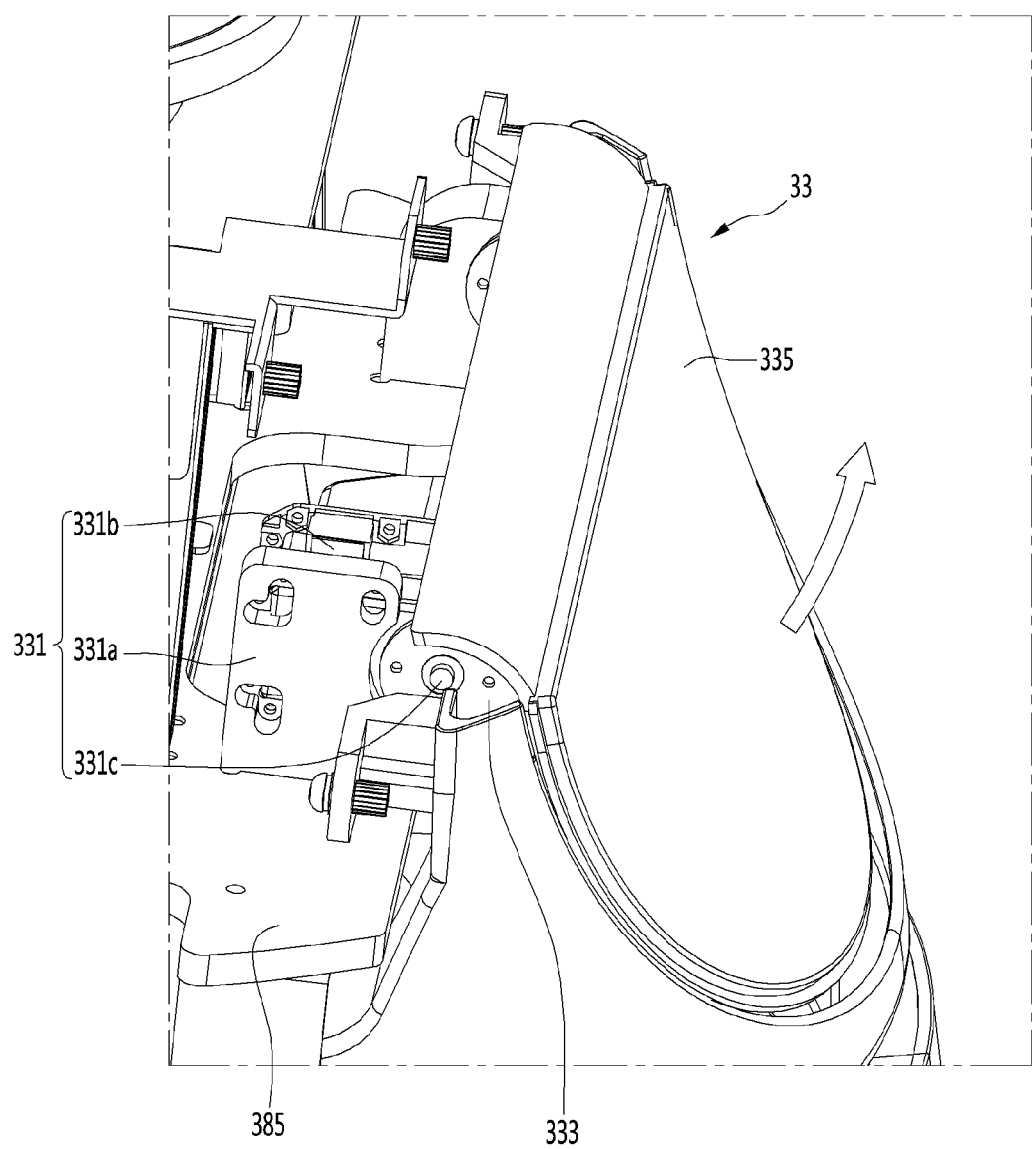
FIG. 11 is a view illustrating the configuration of the garbage insertion part according to an embodiment of the present description.

FIG. 11 is a view illustrating the configuration of the garbage insertion part 33 according to an embodiment of the present description. Referring to FIGS. 3 and 11, according to an embodiment of the present description, the garbage insertion part 33 includes a driving motor assembly 331 to generate rotational force, a cover frame 333 connected with the driving motor assembly 331 to receive the rotational force, and a cover member 335 fixed to the cover frame 333 to shield the mounting opening 311.

The driving motor assembly 331 includes a motor frame 331a mounted on the second horizontal frame 385, a driving motor 331b coupled to the motor frame 331a, and a rotational shaft 331c to transmit the rotational force of the driving motor 331b.

The motor frame 331a is mounted on a front edge of the second horizontal frame 385 to support the motor frame 331a. In addition, the motor frame 331a performs a stopper function of preventing the cover frame 333 from being excessively rotated when the cover frame 333 is rotated.

The driving motor 331b generates the rotational force to transmit the rotational force to the rotational shaft 331c. In addition, the rotational shaft 331c is coupled to the cover frame 333 to transmit the rotational force to the cover frame 333 such that the cover frame 333 is rotatable at a predetermined angle.

The cover frame 333 rotates the cover member 335 by the rotational force received from the rotational shaft 331c. The cover frame 333 may include a first part pin-coupled to the rotational shaft 331 and a second part extending from the first part to support the cover member 335. The second part may have a hollow structure therein and the shape of a plate.

The cover member 335 is coupled to the cover frame 333 to selectively shield the mounting opening 311. The cover member 335 may have a semi-circular shape by way of example.

When an open signal is input to the driving motor 331a, the rotational shaft 331b rotates, so the cover member 335 may open upward by the cover frame 333. In addition, when a closed signal is input to the driving motor 331a, the rotational shaft 331b rotates in an opposition direction, so the cover member 335 may be closed downward.

As described above, although the present description has been described with reference to accompanying drawings, the present description is not limited to embodiments and drawings disclosed in this specification. It should be understood that various modifications can be made by a person skilled in the art within the scope of the technical spirit of the present description. When the embodiments of the present description are described, although the effects of the present description are not explicitly described, it should be understood that the effects may be predicted by relevant features.

The present description has the following attributes associated with the guide robot. First, the trash can assembly is provided inside the guide robot, and the garbage insertion part is provided in an outer case corresponding to an upper portion of the trash can assembly. Accordingly, the garbage inserted through the garbage insertion part may be stably dropped into the trash can assembly by the self-load of the garbage.

Second, the trash can assembly is provided inside the front case forming the front outer appearance of the guide robot and the display unit is provided in the rear case forming the rear outer appearance of the guide robot. Accordingly, the trash can is not viewed to the outside, so aesthetics may be obtained. In addition, bed odor produced from the garbage stored in the trash can may be prevented from being escaped to the outside.

Third, the sensing member is provided in the storage chamber, in which the trash can assembly is received, to sense an amount of garbage stored in the trash can. Accordingly, the amount of garbage stored in the trash can may be more exactly sensed.

Fourth, the garbage which has passed through the garbage insertion part may be guided by the garbage guide part and stored in the garbage storage part. Accordingly, the garbage may be prevented from being out of the garbage storage part.

Fifth, the garbage insertion part may be rotated to selectively open or close at least a portion of the mounting opening of the front case. Accordingly, the garbage insertion part is not open always, but opens only in use. Accordingly, the use convenience may be improved and the bed odor produced from the garbage may be minimized.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Aspects of the present description provide a guide robot capable of easily collecting garbage by providing the function of a trash can to the robot, as well as a display function. Aspects of the present description provide a guide robot in which garbage inserted into a garbage insertion part may be stably received in a trash can without a separate member.

Other aspects of the present description provide a guide robot capable of minimizing bed odor produced by garbage stored in a trash can while preventing the trash can from being viewed to the outside. Additionally, aspects of the present description provide a guide robot capable of exactly sensing an amount of garbage stored in a trash can and notifying a user of the amount of garbage. Aspects of the present description further provide a guide robot in which a trash can may be stably supported in a storage chamber, and may be easily withdrawn and detached from the storage chamber. Aspects of the present description provide a guide robot in which a garbage insertion part is selectively open, thereby improving use convenience and minimizing bed odor produced from the garbage.

According to an embodiment of the present description, the guide robot incudes a front case forming a front outer appearance of a body part and including the trash can assembly provided inside the front case, and a rear case forming a rear outer appearance of the body part and including the display unit.

In this case, the front case has a mounting opening in which a garbage insertion part is mounted for insertion of garbage into the trash can assembly, and the mounting opening is positioned above the trash can assembly. Accordingly, the garbage inserted through the garbage insertion part may be stably dropped into the trash can assembly by the self-load of the garbage.

The body part further includes a garbage guide part to guide garbage, which is inserted through the garbage insertion part, into the trash can assembly, and the garbage guide part is positioned above the trash can assembly, inside the front case.

In this case, the garbage guide part may have an opening into which a portion of the garbage insertion part is inserted, and the garbage insertion part selectively may shield the opening of the garbage guide part.

For example, the garbage guide part may a front surface part having a front opening into which a portion of the garbage insertion part is inserted, a pair of lateral side parts extending in a rearward direction from opposite sides of the front surface part, and a rear surface part connecting end portions of the pair of lateral side surfaces with each other. The lower end portions of the front surface part, the lateral side parts, and the rear surface part may be connected with each other to form a bottom surface opening.

In addition, the trash can assembly may be formed in a sealed shape and may have a top surface which is open. The bottom surface opening of the garbage guide part may be positioned right above of the open top surface of the trash can assembly.

Further, the garbage guide part may further include a locking part to be inserted into the front case, and the locking part may be bent downward from the front surface part to extend and inserted into a step part provided inside the front case. Accordingly, the garbage guide part may be firmly mounted.

In addition, the garbage guide part may further include a blocking part to prevent garbage, which has passed through the front opening, from going rearward from the garbage guide part, and the blocking part may be formed to extend from an upper end portion of the rear surface part and to be connected with the pair of lateral side parts. Accordingly, the garbage inserted through the garbage insertion part may be easily received in the garbage storage part without deviating to the outside from the garbage insertion part.

In addition, the garbage insertion part may be rotated to selectively open or close at least a portion of a mounting opening of the front case. Accordingly, the use convenience may be improved and the bed odor may be minimized.

In addition, the garbage insertion part includes a driving motor assembly to generate rotational force, a cover frame connected with the driving motor assembly to receive the rotational force, and a cover member fixed to the cover frame to shield the mounting opening.

In addition, the front case may include a storage chamber to receive the trash can assembly therein and a main door to selectively open/close the storage chamber. Accordingly, the trash can is not viewed from the outside. Therefore, aesthetics may be improved and the bed odor produced from the garbage stored in the trash can is prevented from being escaped to the outside.

Further, the storage chamber may include a bottom surface, on which the trash can assembly is placed, opposite lateral sides connected with the bottom surface, and a rear surface connecting the lateral sides with the bottom surface. The sensing members may be provided on the opposite lateral sides to sense an amount of garbage stored in the trash can assembly In this case, the sensing member may include a transmitter provided on a first lateral side of the storage chamber to transmit a signal, and a receiver provided on a second lateral side of the storage chamber to receive a signal.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
a first housing, a wheel that rotates to move the robot being provided at the first housing; and
a second housing coupled to the first housing, a bin and a display being provided at the second housing,
wherein the second housing includes:
a first case forming an outer appearance of the second housing in a first horizontal direction, the bin being provided in the first case; and
a second case forming an outer appearance of the second housing in a second horizontal direction that differs from the first horizontal direction, the display being provided in the second case.

2. The robot of claim 1, wherein the first case has an opening through which garbage is inserted into an interior of the bin, and
wherein the opening is positioned above the bin.

3. The robot of claim 2, wherein the second housing further includes:
a chute to guide garbage, which is inserted through the opening in the first case, to the bin, and
wherein the chute is positioned above the bin and inside the first case.

4. The robot of claim 3, further comprising a cover,
wherein the chute has an opening into which a portion of the cover is inserted, and
wherein the cover selectively blocks at least a portion of the opening of the chute.

5. The robot of claim 3, wherein the chute includes:
a front surface having a front opening into which a portion of the cover is inserted;
a pair of lateral side surfaces extending in a rearward direction from sides of the front surface; and
a rear surface connected to ends of the pair of lateral side surfaces, and
wherein lower ends of the front surface, the lateral side surfaces, and the rear surface are connected with each other to form a bottom opening.

6. The robot of claim 5, wherein the bin is formed to have an open top, and
wherein the bottom opening of the chute is positioned above the open top of the bin.

7. The robot of claim 5, wherein the chute further includes a locking extension, and
wherein the locking extension is bent downward from the front surface and is configured to be inserted into a step surface provided inside the first case.

8. The robot of claim 5, wherein the chute further includes a blocking surface to prevent garbage, which has passed through the opening in the first case, from going rearward from the chute, and
wherein the blocking surface is formed to extend from an upper end of the rear surface and to be connected with the pair of lateral side surfaces.

9. The robot of claim 2, further comprising a cover, wherein the cover is rotated to selectively open or close at least a portion of the opening of the first case.

10. The robot of claim 9, further comprising:
a motor to generate a force; and
a frame configured to receive the force from the motor and to apply the force to the cover such that the cover moves in the opening in the first case.

11. The robot of claim 10, further comprising:
a first horizontal frame provided inside the second housing;
an inner case provided to extend upright on the first horizontal frame to form an electronic part chamber; and
a second horizontal frame provided on an upper end of the inner case,
wherein the motor is mounted on a top surface of the second horizontal frame.

12. The robot of claim 2, wherein the first case includes:
a storage chamber to receive the bin therein; and
a door to selectively open or close the storage chamber.

13. The robot of claim 12, wherein the storage chamber is formed as a portion of a front surface of the first case that is recessed rearward, and
wherein the bin is mounted detachably from the storage chamber.

14. The robot of claim 13, wherein the storage chamber includes a bottom surface on which the bin is placed, sides surfaces connected to the bottom surface, and a rear surface coupled to the side surfaces and the bottom surface, and
wherein sensors are provided on the side surfaces to detect an amount of garbage stored in the bin.

15. The robot of claim 14, wherein the sensor includes:
a transmitter provided on a first one of the side surfaces of the storage chamber to transmit a signal; and
a receiver provided on a second one of the side surfaces of the storage chamber to selectively receive the signal based on the amount of garbage in the bin.

16. The robot of claim 1, further comprising;
a third case rotatably coupled to an upper region of second case, wherein a touch screen device is provided in the third case and is oriented to output visual content in the first horizontal direction.

17. A robot comprising:
a first housing, a wheel that rotates to move the robot being provided at the first housing; and
a second housing provided over the first housing, a bin and a display being provided in the second housing,
wherein the second housing includes:
an opening positioned above the bin and through which garbage is inserted into an interior of the bin; and
a chute to guide garbage, which is inserted through the opening, to the bin, and
wherein the opening opens in a first horizontal direction that differs from a second horizontal direction associated with an output of the display.

18. The robot of claim 17, further comprising a cover,
wherein the chute includes:
a front surface having a front opening into which a portion of the cover is inserted, the cover selectively blocking at least a portion of the front opening;
a pair of lateral side surfaces extending in a rearward direction from sides of the front surface; and
a rear surface connected to the pair of lateral side surfaces, and
wherein lower ends of the front surface, the lateral side surfaces, and the rear surface are connected with each other to form a bottom opening positioned above of an open top of the bin.

19. The robot of claim 17, further comprising:
a cover, wherein the cover is rotated to selectively open or close at least a portion of the opening of the second housing;
a motor to generate a force; and
a frame configured to receive the force from the motor and to apply the force to move the cover in the opening of the second housing.

20. The robot of claim 17, wherein the display provides information to a user following the robot as the robot moves, and wherein the opening is not visible to the user when following the display.

* * * * *